US012747835B2

(12) United States Patent
Sleiman et al.

(10) Patent No.: US 12,747,835 B2
(45) Date of Patent: Sep. 29, 2026

(54) GASEOUS FUEL STORAGE SYSTEM

(71) Applicant: FirstElement Fuel Inc., Irvine, CA (US)

(72) Inventors: Ghassan Sleiman, Torrance, CA (US); Tim Brown, San Juan Capistrano, CA (US)

(73) Assignee: FIRSTELEMENT FUEL INC., Irvine, CA (US)

( * ) Notice: Subject to any disclaimer, the term of this patent is extended or adjusted under 35 U.S.C. 154(b) by 171 days.

(21) Appl. No.: 18/724,310

(22) PCT Filed: Dec. 23, 2022

(86) PCT No.: PCT/US2022/082324

§ 371 (c)(1),
(2) Date: Jun. 26, 2024

(87) PCT Pub. No.: WO2023/129885

PCT Pub. Date: Jul. 6, 2023

(65) Prior Publication Data

US 2025/0067402 A1 Feb. 27, 2025

Related U.S. Application Data

(60) Provisional application No. 63/294,092, filed on Dec. 28, 2021.

(51) Int. Cl.

*F17C 13/12* (2006.01)
*F17C 13/04* (2006.01)
*F17C 13/08* (2006.01)

(52) U.S. Cl.

CPC .............. *F17C 13/12* (2013.01); *F17C 13/04* (2013.01); *F17C 13/083* (2013.01);
(Continued)

(58) Field of Classification Search

CPC ........ F17C 13/12; F17C 13/04; F17C 13/083; F17C 2201/0109; F17C 2201/035;
(Continued)

(56) References Cited

U.S. PATENT DOCUMENTS 4,989,160 A * 1/1991 Garrett ................ H10P 72/0604 700/282
6,406,519 B1 * 6/2002 Tom .......................... F17C 7/00 95/902

(Continued)

FOREIGN PATENT DOCUMENTS

CN 107785596 A * 3/2018 ........ H01M 8/04111
CN 209415034 9/2019

(Continued)

OTHER PUBLICATIONS

International Search Report and Written Opinion issued on Mar. 29, 2023 for International Patent Application No. PCT/US2022/082324.

*Primary Examiner* — Bob Zadeh
(74) *Attorney, Agent, or Firm* — Shumaker, Loop & Kendrick, LLP

(57) ABSTRACT

A gaseous fuel storage system includes: one or more storage tanks, each having a first end and a second end, the first end of each tank having a connection fitting; a piping and valving assembly coupled to the connection fitting, wherein each of the one or more tanks is coupled to an outlet line through a remote shut off valve; a first cabinet surrounding the piping and valving assembly and a portion of the first end of the storage tanks; a detector disposed in the first cabinet which operable to detect the presence of hydrogen gas and generate a signal representative of a hydrogen gas concentration; and an electronic controller operably connected to the sensor apparatus and to the remote shut off valve, wherein the electronic controller is programmed to close all
(Continued)

of the remote shut off valves in response to detection of a first predetermined concentration of hydrogen.

9 Claims, 3 Drawing Sheets

(52) U.S. Cl.
CPC *F17C 2201/0109* (2013.01); *F17C 2201/035* (2013.01); *F17C 2203/0639* (2013.01); *F17C 2205/0111* (2013.01); *F17C 2205/0142* (2013.01); *F17C 2205/0176* (2013.01); *F17C 2205/0326* (2013.01); *F17C 2205/0332* (2013.01); *F17C 2205/0352* (2013.01); *F17C 2221/012* (2013.01); *F17C 2250/032* (2013.01); *F17C 2250/0439* (2013.01); *F17C 2250/0452* (2013.01); *F17C 2270/0139* (2013.01)

(58) Field of Classification Search
CPC ...... F17C 2203/0639; F17C 2205/0111; F17C 2205/0142; F17C 2205/0176; F17C 2205/0326; F17C 2205/0332; F17C 2205/0352; F17C 2221/012; F17C 2250/032; F17C 2250/0439; F17C 2250/0452; F17C 2270/0139; F17C 2201/054; F17C 2205/0192; F17C 2205/0329; F17C 2223/0123; F17C 2223/036; F17C 2250/0636; F17C 2260/042; Y02E 60/32
See application file for complete search history.

(56) References Cited

U.S. PATENT DOCUMENTS

| | | | | |
|---|---|---|---|---|
| 2002/0078824 | A1 | 6/2002 | Tom et al. | |
| 2003/0164202 | A1 * | 9/2003 | Graham | B60S 5/02 141/98 |
| 2013/0284465 | A1 | 10/2013 | Broidy | |
| 2020/0010966 | A1 * | 1/2020 | Kazuno | C25B 15/02 |
| 2020/0208783 | A1 * | 7/2020 | Lim | C23C 16/45561 |
| 2025/0067402 | A1 * | 2/2025 | Sleiman | F17C 13/12 |

FOREIGN PATENT DOCUMENTS

| | | | | | |
|---|---|---|---|---|---|
| CN | 209415034 | U | * | 9/2019 | |
| CN | 211118757 | | | 7/2020 | |
| CN | 113090943 | | | 7/2021 | |
| CN | 113090943 | A | * | 7/2021 | F17C 13/08 |
| CN | 113175244 | | | 7/2021 | |
| CN | 115307057 | A | * | 11/2022 | F17C 13/02 |
| CN | 117346067 | A | * | 1/2024 | H01M 8/04201 |
| NL | 8800709 | | | 10/1989 | |

* cited by examiner

GASEOUS FUEL STORAGE SYSTEM

BACKGROUND OF THE INVENTION

This invention relates generally to gaseous fuel handling and more particularly to apparatus for storing gaseous fuels such as hydrogen.

Hydrogen filling stations for vehicles typically store hydrogen in the gas phase at high pressures, for example 45 MPa to 93 MPa. These stations include storage vessels as well as numerous pipes, valves, and fittings, all of which have the potential for leakage.

Leakage of hydrogen in the presence of ignition sources carries the risk of fire. The risk can be mitigated by providing large safety distances (setbacks) from other structures.

However, large setbacks use land inefficiently. Furthermore, there is a desire to locate hydrogen storage facilities in densely populated areas, for example co-locating them with existing fuel stations.

BRIEF SUMMARY

This desire is addressed by a gaseous fuel storage system configured to mitigate hazards associated with fuel leaks and hence reduce the necessary separation distances.

According to one aspect of the technology described herein, a gaseous fuel storage system includes: one or more storage tanks, each storage tank having a first end and a second end, the first end of each storage tank having a connection fitting; a piping and valving assembly coupled to the connection fitting, wherein each of the one or more tanks is coupled to an outlet line through a remote shut off valve; a first cabinet surrounding the piping and valving assembly and a portion of the first end of the one or more storage tanks; a detector disposed in the first cabinet which is operable to detect the presence of hydrogen gas and generate a signal representative of a concentration of the hydrogen gas; and an electronic controller operably connected to the sensor apparatus and to the remote shut off valve, wherein the electronic controller is programmed to close all of the remote shut off valves in response to detection of a first predetermined concentration of hydrogen.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
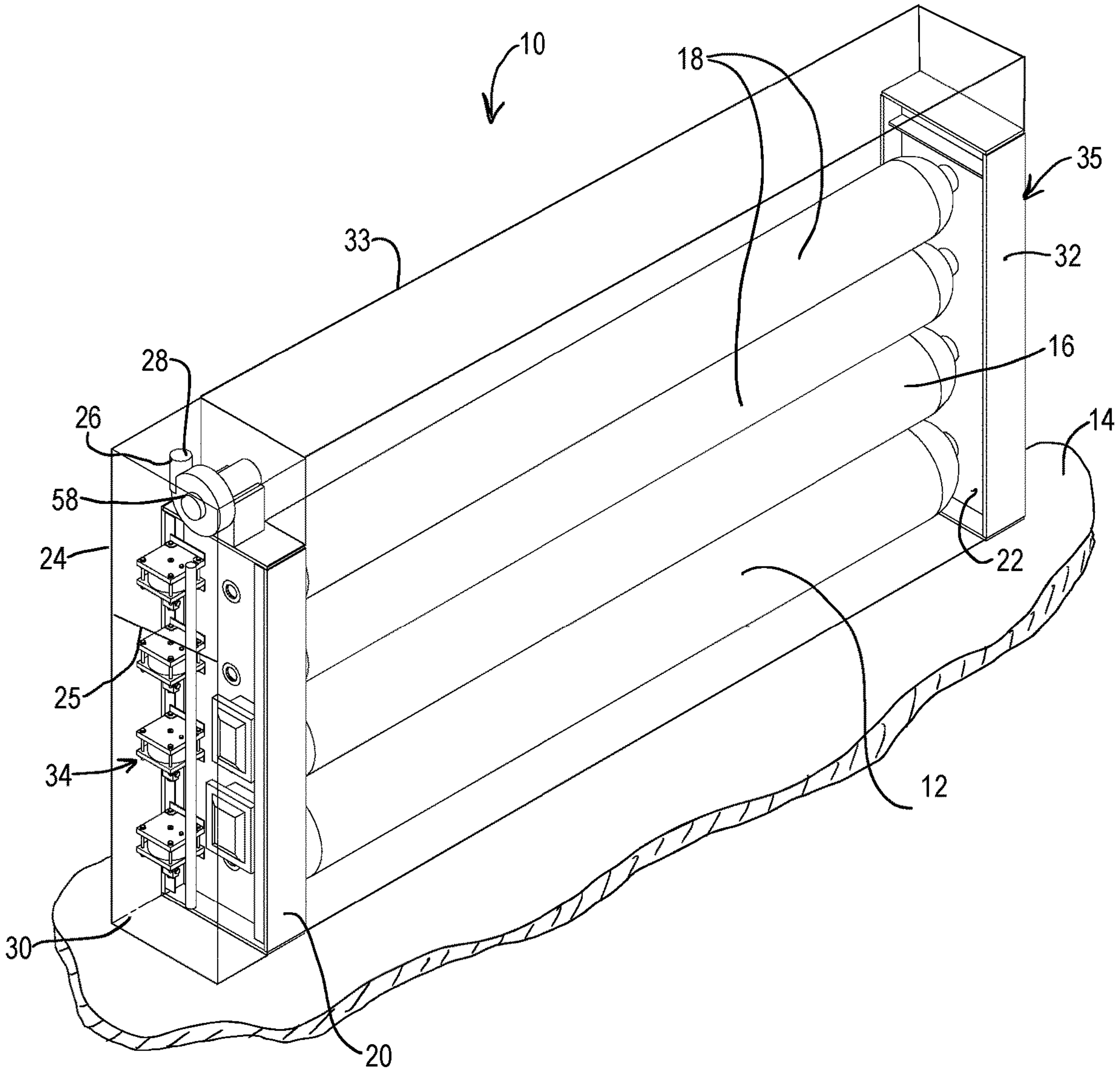
FIG. 1 is a schematic perspective view of an exemplary fuel storage system.

Referring to the drawings wherein identical reference numerals denote the same elements throughout the various views, FIG. 1 depicts a fuel storage system 10. The fuel storage system 10 is especially useful for storing gaseous hydrogen; however, the principles described herein are generally applicable to a storage system for any type of flammable gaseous fuel. The storage system 10 may implement multiple techniques for preventing injury or property damage by fire. These techniques constitute "layers" of protection, all of which must be breached to result in a casualty. These layers include: preventing leaks; reducing hydrogen gas concentration after a leak; stopping the source of a leak; preventing ignition sources, and mitigating the effect of igniting the hydrogen. The basic components of the storage system 10 are storage tanks, end cabinets, a piping and valving assembly, and (optionally) an external facade.

The storage tanks have a suitable volume and physical properties for storing hydrogen at the intended temperatures and pressures. In the illustrated example, the storage tanks comprise a plurality of steel cylinders having opposed first and second ends with suitable fittings for being connected to pipes, valves, caps or similar equipment.

A first tank 12 is oriented horizontally and is positioned at or near ground level, for example on a concrete slab 14. A second tank 16 is oriented parallel to the first tank 12 and is positioned just above the first tank 12. A third tank 18 is oriented parallel to the first and second tanks 12, 16 and is positioned just above the second tank 16. (In this example, the third tank 18 is configured as a pair of tanks).

This is merely one representative configuration of the tanks. More or fewer tanks could be used, or they could be mounted in different physical arrangements.

The outer surface of each of the tanks 12, 16, and 18 may have a protective fire barrier applied thereto. One non-limiting example of a suitable barrier is an epoxy-based intumescent coating. Such materials are available from Sherwin-Williams Company, Cleveland, Ohio 44115 USA. This barrier helps to mitigate the effect of fire should the hydrogen be ignited.

In this particular example, the tanks 12, 16, and 18 are configured for a cascade filling procedure and are thus configured to store gaseous hydrogen at different pressures. For example, the first tank 12 may be used to store gaseous hydrogen at approximately 45 MPa, the second tank 16 may be used to store gaseous hydrogen at approximately 63 MPa, and the third tank 18 may be used to store gaseous hydrogen in approximately 93 MPa.

The first ends of the tanks 12, 16, and 18 are mounted to a first support bracket 20 which is in turn mounted to the slab 14. The first support bracket 20 may be fabricated from steel and has a structure similar to an I-beam.

The second ends of the tanks 12, 16, and 18 are mounted to a second support bracket 22 which is in turn mounted to the slab 14. The second support bracket 22 may be fabricated from steel and has a structure similar to an I-beam.

A first cabinet 24 is mounted to the slab 14 adjacent the first support bracket 20. The first cabinet 24 is a box-like structure equipped with an access door 25. The first cabinet 24 is "fire-rated", meaning it is designed to protect the public from a potential hydrogen jet fire inside the first cabinet 24 and to protect the fuel storage system 10 from potential external fires. More specifically, the first cabinet 24 is made from a non-combustible material such as steel. Joints between cabinet components, gaps, pipe penetrations, and access openings are sealed with appropriate fire-resistant materials such as intumescent foam gaskets. Fire-rating of the first cabinet 24 provides additional mitigation in the event of fire.

The first cabinet 24 in this example is sized to mate with and extend laterally over and vertically above the first support bracket 20. Collectively, the first support bracket 20 and the first cabinet 24 define an enclosed space. This space is configured to contain the piping and valving assembly described below. The top of the first cabinet 24 includes an opening 26 for an exhaust pipe 28. A lower portion of the first cabinet 24 includes an intake opening 30.

A second cabinet 32 is mounted to the slab 14 adjacent the second support bracket 22. The second cabinet 32 is a box-like structure equipped with an access door 35. The second cabinet 32 is fire-rated as described for the first cabinet 24.

The second cabinet 32 in this example is sized to mate with the second support bracket 22. Collectively, the second support bracket 22 and the second cabinet 32 define an enclosed space.

An external facade or weather enclosure 33 may be provided over the exposed portions of the tanks 12, 16, 18.

A piping and valving assembly 34 is disposed inside the first cabinet 24.

The piping and valving assembly 34 is configured to accommodate safe cascade operation. This means that the highest pressure tank (or bank of tanks) is filled first from the compression system (not shown), then the intermediate-pressure tank (or bank of tanks), and then the lowest-pressure tank (or bank of tanks). When dispensing to vehicles, the storage system will offload in reverse order from the lowest-pressure tank (or bank of tanks) to the highest-pressure tank (or bank of tanks). This maintains optimal pressure for filling light-duty vehicles and minimizes station energy consumption. This process also optimizes the amount of gaseous hydrogen storage required.

Figure 2:
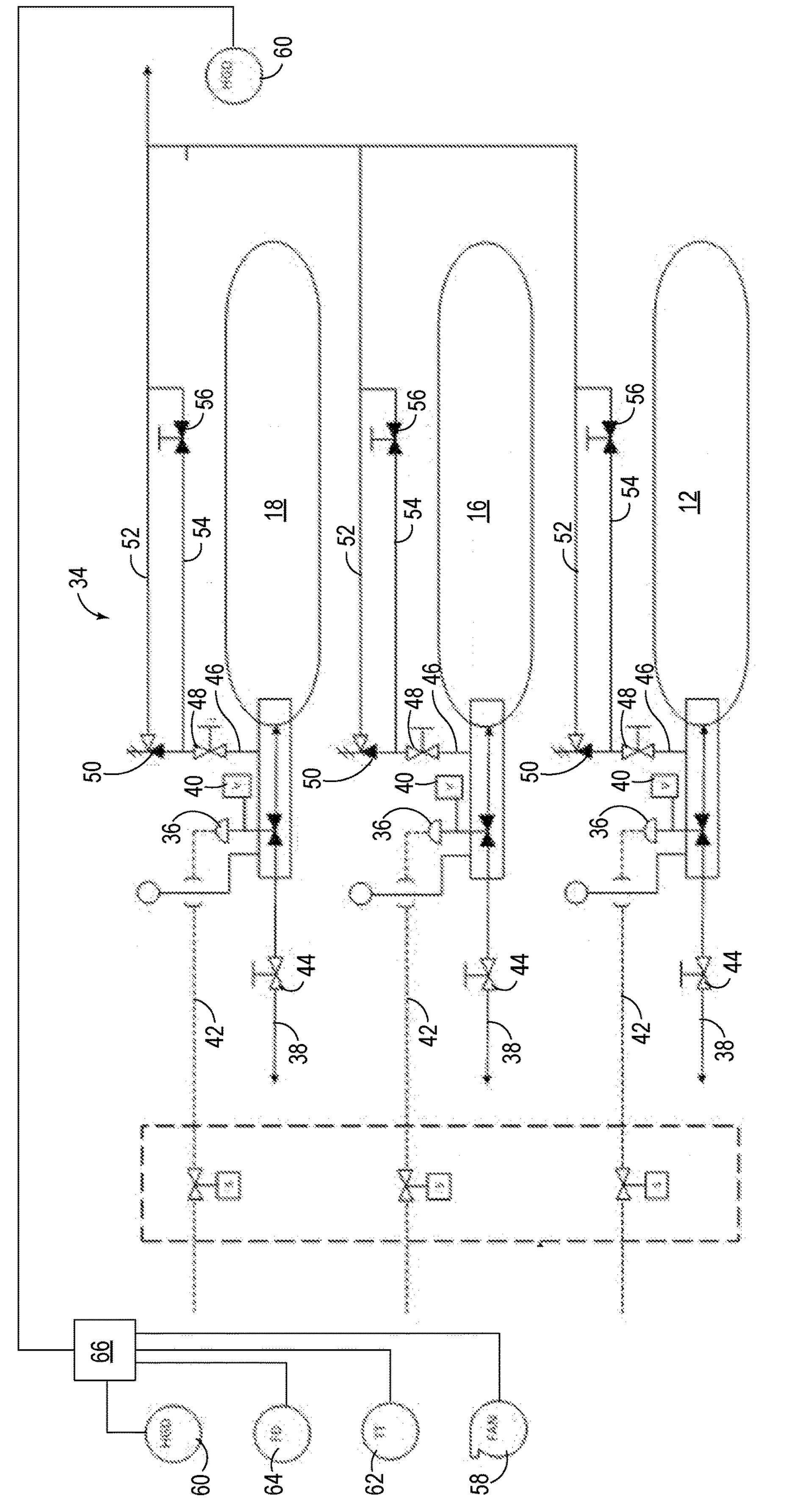
FIG. 2 is schematic piping and instrumentation diagram of the fuel storage system.

The piping and valving assembly 34 is shown schematically in FIG. 2. It will be understood that the piping and valving assembly 34 includes a similar sub-assembly of pipes, valves, and fittings for each of the tanks, the only differences between the sub-assemblies being in the component specifications (e.g. pipe sizes, valve pressure set-points). For simplicity of explanation, only the sub-assembly for the first tank 12 will be described in detail.

A remote shut off valve 36 is connected directly to the first tank 12 and discharges through an outlet line 38. In the illustrated example, the remote shut off valve 36 is pneumatically operated and electrically controlled by a solenoid 40. The remote shut off valve 36 is connected to a supply line 42 of pressurized gas such as compressed air.

A manually-operated shut off valve 44 such as a hand needle valve is connected in the outlet line 38 downstream of the shut off valve 44. When both the remote shut off valve 36 and the shut off valve 44 are open, hydrogen gas can flow through the outlet line 38.

A relief line 46 is coupled to the first tank 12 in parallel with the remote shut off valve 36. A manually-operated isolation valve 48 is disposed in the relief line 46.

A pressure relief valve 50 is connected downstream of the isolation valve 48. The pressure relief valve 50 is configured to open when pressure in the first tank 12 exceeds a predetermined pressure set point. The pressure relief valve 50 is connected to a vent line 52 which is connected to a station stack (not shown) that communicates with the outside environment. This vent line 52 is not part of the fuel storage system 10.

A bleed line 54 runs from the relief line 46, at a point between the isolation valve 48 and the pressure relief valve 50, to the vent line 52. A manually-operated vent valve 56 is disposed in the bleed line 54. The function of this valve is to permit the relief line 46 to be bled down to permit servicing of the pressure relief valve 50.

The chance of leaks can be reduced by eliminating the use of O-ring, plastic, or soft seals to seal hydrogen within the cabinets 24, 32. Soft-seal connections are more likely to cause large leaks (e.g., a leakage path with an area of 1% or more of pipe inner diameter). In the illustrated example, mechanical connections are metal-to-metal seals with metal fasteners; all hydrogen tubing, valves, and fittings are designed for hydrogen service to at least 138 MPa. Leaks are further reduced by minimizing the number of mechanical connections.

For this purpose, the first cabinet 24 includes a ventilation fan 58. The ventilation fan 58 is effective to draw fresh air from the intake opening 30, purge hydrogen gas and/or combustion products from the interior of the first cabinet 24, and exhaust them through exhaust pipe 28 which passes through the opening 26 in the first cabinet 24. The ventilation fan 58 is effective for reducing the concentration of hydrogen in the event a leak occurs.

For the purpose of preventing ignition sources in the event a leak occurs, all piping may be electrically bonded, and the storage unit may be grounded to prevent ignition from static electricity. All electrical equipment meets appropriate safety codes for the working environment, to eliminate electrical ignition sources. One example would be certification for Class 1, Division 2, Group B of the National Electrical Code (NEC), published by the National Fire Protection Association (NFPA). Furthermore, the exhaust of the ventilation fan 58 is located away from any ignition sources.

The system 10 may be equipped with the sensor apparatus including one or more sensors operable to detect a physical property or condition inside one or both of the cabinets 24, 32 in generate a single representative thereof. Examples of such sensors are set forth below.

The system 10 is equipped with one or more hydrogen gas detectors 60. Each hydrogen gas detector 60 is operable to detect the presence of hydrogen gas and generate a signal representative of the concentration of hydrogen gas. Such detectors are commercially available. In the illustrated example, one hydrogen gas detector 60 is disposed inside each of the cabinets 24, 32.

The system 10 is equipped with one or more heat detectors 62. Each heat detector 62 is operable to sense ambient temperature and generate a signal representative thereof. Such detectors are commercially available. In the illustrated example, one heat detector 62 is disposed inside the first cabinet 24.

The system 10 is equipped with one or more flame detectors 64. Each flame detector 64 is operable to detect the presence of flame based on radiant energy emissions, e.g., ultraviolet (UV) and/or infrared (IR), and to generate a signal representative of the presence of a flame. Such detectors are commercially available. In the illustrated example, one flame detector 64 is disposed inside the first cabinet 24.

The system 10 includes an electronic controller 66. The controller 66 includes one or more processors capable of executing ladder logic, programmed instructions, or some combination thereof. For example, it may be a general-purpose microcomputer of a known type, such as a PC-based computer, or may be a custom processor, or may incorporate one or more programmable logic controllers (PLC). The controller 66 is operably connected to the individual functional components of the storage system 10 as well as the sensors described above in order to receive data and/or transmit commands to each sensor or component.

The controller 66 is programmed to carry out one or more actions to prevent fire, and/or to prevent injury or property damage in the event of a fire. The basic operation involves sensing various conditions in the cabinets 24, 32. When any condition is detected outside of the prescribed conditions, all of the remote shut off valves would be closed. Examples of specific actions are described below.

Upon detection of cabinet temperature above a predetermined limit, the controller 66 automatically closes all of the remote shut off valves 36. This is one example of a "fire condition".

Upon detection of the presence of a flame in the cabinet 24, the controller 66 automatically closes all of the remote shut off valves 36. This is another example of a "fire condition".

Upon detection of a first predetermined concentration of hydrogen in the cabinet area, the controller 66 automatically starts the ventilation fan 58, thereby reducing the hydrogen concentration. In one example, the first predetermined concentration may be 0.4%.

Upon detection of a second predetermined concentration of hydrogen in the cabinet area, the controller 66 automatically closes all of the remote shut off valves 36. In one example, the second predetermined concentration may be 1%. This is another example of a "fire condition".

A Hazard and Operability study (HAZOP) was conducted for the exemplary fuel storage system 10 to determine appropriate setbacks (separation distances).

NFPA 2 (Hydrogen Technologies Code) provides a broad set of requirements and best practices for building and installing hydrogen equipment ranging from vessel certifications and piping materials to signage and emergency plans. The fuel storage system 10 will meet or exceed all of these criteria. In addition, separation distances between hydrogen equipment and various exposures contribute to total system safety in the prescriptive NFPA code. Due to space constraints, the proposed locations for the fuel storage system 10 cannot accommodate all of the prescribed separation distances.

NFPA 2 provides for the use of systems, methods, or devices of equivalent or superior quality, strength, fire resistance, effectiveness, durability and safety over those prescribed in the code. It is with this allowance that the fuel storage system 10 is able to be deployed safely with reduced separation distances.

Figure 3:
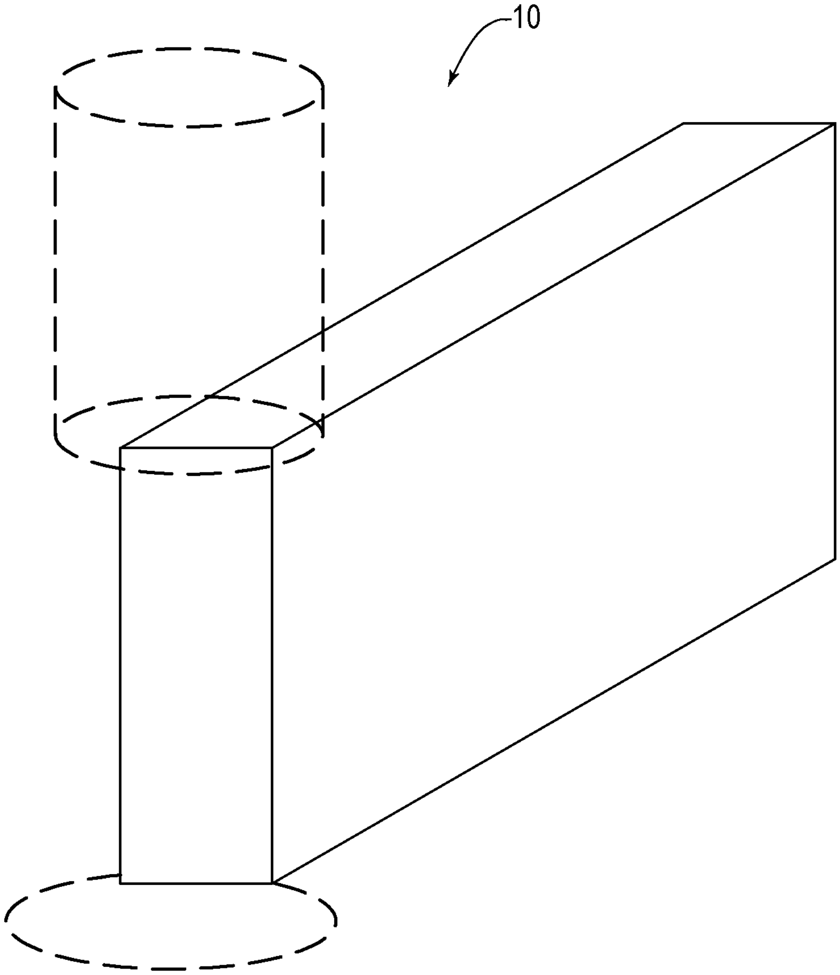
FIG. 3 is a schematic perspective view of the fuel storage system, showing safety separation distances.

The likelihood of a leak at the storage is prevented by various means as described above. However, in the unlikely event of a leak, the unignited combustible hydrogen cloud dispersion or resulting heat radiation after ignition were analyzed. While the maximum extent of an unignited hydrogen cloud or the maximum heat flux from an ignited plume will only last a few seconds (due to automatic shutoff of the remote shutoff valves 36), the setbacks were calculated based on these worst-case scenarios. Simulations were conducted both for an unignited release (to determine the size of a combustible hydrogen cloud) and for an ignited release (to determine the extend of heat radiation). Based on these simulations, setback distances were determined For a storage system 10 having approximate overall dimensions of 0.61 m (2 ft.) wide by 1.5 m (5 ft.) by 9.8 m (32 ft.) long, the following separation zones were calculated to be acceptable: (A) a cylinder centered on the exhaust exit, diameter 2.4 m (8 ft.), height 18.3 m (60 ft.) tall; and (B) a circular surface area diameter 0.91 m (3 ft.) from the storage bottom opening at each end. These are shown in FIG. 3. These are significantly smaller than would be required in the absence of the layers of protection as described herein.

The foregoing has described a gaseous fuel storage system and method for its operation. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A gaseous fuel storage system, comprising:

one or more storage tanks, each of the one or more storage tanks having a first end and a second end, the first end of each of the one or more storage tanks having a connection fitting, wherein each storage tank is oriented horizontally;

wherein the first end of the one or more storage tanks is mounted to a first support bracket which is in turn mounted to a slab positioned on a ground level;

wherein the second end of each of the one or more storage tanks is mounted to a second support bracket which is in turn mounted to the slab;

a piping and valving assembly coupled to the connection fitting, including one or more remote shut off valves, wherein each of the one or more tanks is coupled to an outlet line through one of the one or more remote shut off valves;

a first cabinet surrounding the piping and valving assembly and a portion of the first end of each of the one or more storage tanks, wherein collectively, the first support bracket and the first cabinet define an enclosed space;

a second cabinet surrounding a portion of the second end of each of the one or more storage tanks, wherein collectively, the second support bracket and the second cabinet define an enclosed space;

a sensor apparatus including a detector disposed in the first cabinet which is operable to detect presence of hydrogen gas and generate a signal representative of a concentration of the hydrogen gas; and an electronic controller operably connected to the sensor apparatus and to the one or more remote shut off valves, wherein the electronic controller is programmed to close the one or more remote shut off valves in response to detection of a first predetermined concentration of the hydrogen gas.

2. The system of claim 1, wherein the first cabinet includes a ventilation fan configured to purge the hydrogen gas from the interior of the first cabinet and exhaust the hydrogen gas through an exhaust pipe.

3. The system of claim 2, wherein:

the electronic controller is programmed to start the ventilation fan in response to detection of a second predetermined concentration of the hydrogen gas in the first cabinet, thereby reducing the hydrogen gas concentration.

4. The system of claim 1, wherein a heat detector is disposed in the first cabinet which is operable to sense ambient temperature and generate a signal representative thereof.

5. The system of claim 4, wherein:

the electronic controller is programmed to close the one or more remote shut off valves in response to detection of the ambient temperature above a predetermined threshold temperature.

6. The system of claim 5, wherein the sensor apparatus includes a flame detector disposed in the first cabinet which is operable to detect presence of a flame based on radiant energy emissions, and to generate a signal representative of the presence of the flame.

7. The system of claim 6, wherein:

the electronic controller is programmed to close the one or more remote shut off valves in response to detection of the presence of the flame.

8. The system of claim 1, wherein the first cabinet is a box structure including an access door.

9. The system of claim 1, wherein the first cabinet is made from a non-combustible material and joints between cabinet components, gaps, pipe penetrations, and access openings thereof are sealed with fire-resistant materials.

* * * * *